March 24, 1970    A. G. PETERSON    3,501,971
ENDLESS BELT ASSEMBLY WITH IMPROVED INSERT COUPLING
Filed March 25, 1968

INVENTOR.
Arnold G. Peterson
BY
Pearson + Pearson
ATTORNEYS

United States Patent Office 3,501,971
Patented Mar. 24, 1970

3,501,971
ENDLESS BELT ASSEMBLY WITH IMPROVED
INSERT COUPLING
Arnold G. Peterson, Sunapee, N.H., assignor to L. M. & L.
Corporation, Claremont, N.H., a corporation of New
Hampshire
Filed Mar. 25, 1968, Ser. No. 715,869
Int. Cl. F16g 3/07
U.S. Cl. 74—231                                                6 Claims

ABSTRACT OF THE DISCLOSURE

An improved continuous belt assembly suitable for use in high velocity, moderate-load power transmission applications comprising, in combination, a novel internal coupling means and a tough extensible, flexible and tear resistant polymeric belting. The coupling means includes a continuous, circular, external rib having an outer holding edge proximate each opposite end thereof, such edges being adapted to cut into and grip the interior walls of the belting when the coupling means is inserted into hollow ends of the belting and the belting is subsequently mounted on machinery. When made of rigid material, the sharp edges are joined by a connector shaft of at least about 20% larger than the inside diameter of the hollow tubular belting, thus providing means for maintaining the outer diameter of the elastomeric belt uniform between the points at which the aforesaid sharp edges cut into the belt. When made of flexible material, the diameter of the connector shaft may be equal to the inside diameter of the tubing.

BACKGROUND OF THE INVENTION

This invention relates to power transmission means and, more particularly, to a novel endless belt assembly having a novel fastening means and a polymeric belt component of selected physical properties.

The advent of extruded lengths of polymeric materials has been accompanied by efforts to adapt such materials to endless belt applications. A number of fastening means were available for the purpose of connecting two free ends of belting together to form a continuous length. For example, fasteners such as hose couplings could be used, but were impractical for having flanges, barbs, etc., which damaged the belting. Moreover, since many of the endless belt materials were meltable, melt-fusion techniques were also used to form continuous belts. Such methods as these, however, left much to be desired; they normally require special equipment and techniques and are difficult to apply on equipment where there is little room to work and where the belt must be formed in situ.

Other types of sharp pointed prong or barb connector devices tended to tear unreinforced polymeric belting material within an undesirably short time under only moderately severe service conditions.

A major improvement in such fastening means is disclosed in the commonly-owned and co-pending application, Ser. No. 651,527 filed on July 6, 1967, by Arnold G. Peterson. In that application, a novel fastening means in combination wth a tough elastomeric tubing was disclosed. While this was a great improvement over the art and received widespread commercial acceptance, it was found that, in very severe service, the plurality of sharp edges did tend to tear the belt and the connector shaft linking the two holding heads sometimes broke under strain. These problems were in part due to the configuration of the elastomeric tubing over the cutting head, a configuration resulting in successive bumps from the coupling at both extremities of the fastening means as the belt travelled around a pulley. It is believed that these bumps increased the vibrations to which the assembly was subjected during use and, consequently, contributed to its failure in very severe service.

Thus it is a principal object of the present invention to provide a power transmission means which consists of an easily connected endless belt useful under high loads and high velocities for long periods of time without excessive deterioration or tearing of the belt.

It is a further object of the invention to provide an endless belt assembly which can be quickly mounted in a minimum of time and space in situ on a machine without the use of tools.

Another object of the invention is to provide an endless belt assembly with good frictional characteristics for power transmission applications.

Another object of the invention is to provide a novel fastening means for use in the endless belt assembly of the invention.

SUMMARY OF THE INVENTION

Applicants have achieved these objects by utilizing a belting, hollowed at least at the terminals thereof, which belting is comprised of a tough, tear-resistant, and elastic polymer having good abrasion resistance and excellent frictional characteristics for transmitting power between even rather smooth pulley surfaces, together with a coupling means having continuous, circular, external ribs with sharp edges as gripping heads, the sharp edges being adapted for cutting and gripping, but not tearing the aforesaid polymeric belting, and either a relatively short connector shaft having a diameter of at least about 20% greater than the inside dimension of the belting when made of metal, or a relatively long connector shaft, equal in diameter to the said inside dimension when made of flexible material.

The criticality and function of various attributes advantageously possessed by the polymer for co-action with the novel coupling means are discussed hereinbelow.

Toughness and tear resistance

These characteristics allow the polymeric belting to withstand any cutting action of the coupling means and, further, to withstand the tension on the points, resulting from the predetermined deformation of the belt without progressive tearing of the belting.

Elasticity

The polymeric belting in order to be most easily fitted onto some types of equipment must be stretchable at tensions reasonably exertable by a workman. Moreover, the material must then snap back so that it will fit snugly over the pulleys for efficient power transmission.

Abrasion resistance

Belting in high-speed friction-transfer, power transmission applications is subjected to frictional wear. A belting selected for the practice of the instant invention ran successfully for three times as long as the worn belting which it replaced in a typical application. Furthermore at the end of this time, there was no sign of deterioration.

In general, belting used in the instant invention should be constructed of a belting having the following characteristics.

Tear strength; Die B, nicked—at least about 200 lbs. per inch.

Tensile strength elongation

The belting should be sufficiently easy to elongate so that an ordinary workman can extend the length of the belt by at least about 4% to 10%. A belt of the invention, therefore, should require no more than about ten pounds force to elongate it to about 4%; preferably not more than about 100 p.s.i. at temperatures of about 25° C. These latter values are based on an assumption that the belting has a cross-sectional area approximately the same as that of the illustrative example of this invention.

One polymer that ideally suits these requirements is a thermoplastic polyurethane such as that sold under the trade designation MP-1485 by Molded Products Division of the Easthampton Rubber Thread Company.

The coupling means can be machined from aluminum or nylon, by means of an automatic screw machine, or may be injection-molded or otherwise formed. When formed of a flexible material, it is preferred to use a polyurethane elastomer of a grade employing the casting system or a thermo processable grade using a compression or injection molding system. One grade found suitable is an injection molding grade sold by Mobay Chemical Company under the name Texin Urethane 355D and another suitable grade is a blend of Texin 480A and Texin 355D.

Figure 1:
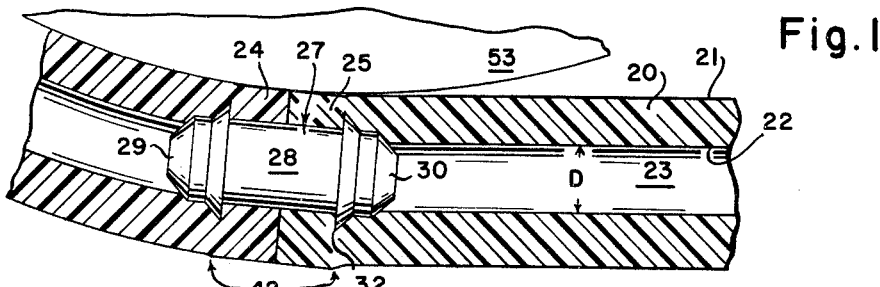
FIGURE 1 is a side elevation, in section, of a fragment of a belt passing around a pulley and connected by a coupling means of the invention.

As shown in the drawing, 20 designates a hollow, tubular elastomeric belt having an exterior normally cylindrical face 21 of predetermined outside diameter, an interior normally cylindrical face 22 of predetermined inside diameter, and the interior space 23. Belt 20 may be cut to any desired length so that the opposite free ends 24 and 25 may be joined to form an endless closed loop. It will be apparent that tubing of solid cross section could be used in the device of the invention, with a suitable cavity at each opposite end, but that hollow tubing is more practical and readily adapted to cutting into desired length.

The coupling means 27 is unitary and symmetrical, being formed of one piece of suitable material such as a tough plastic, metal or the like. It comprises the cylindrical connector shank or shaft 28, which, when made of rigid material (FIGURES 1–3) is of a diameter of at least about 20% greater than the inside diameter of the interior face 22 of belt tubing 20, and a pair of identical integral heads 29 and 30. Each head, such as 30, includes an external, continuous, circular rib, ridge, or flange 31, having a sharp outer gripping edge 32. Edge 32 is formed of a bearing face 33 and a truncated conical face 34. Bearing face 33 is normal to the axis of shank 28 and face 34 forms a 45-degree angle with bearing face 33. Moreover, each head, 29 and 30, includes an end face 35 having a bevel face 36 forming means 37 to promote insertion of heads 29 and 30 into belt tubing 20. Means 37, of course, could alternately be formed by any form of sloping surface, e.g. a rounded face as in FIGURE 4.

Figure 2:
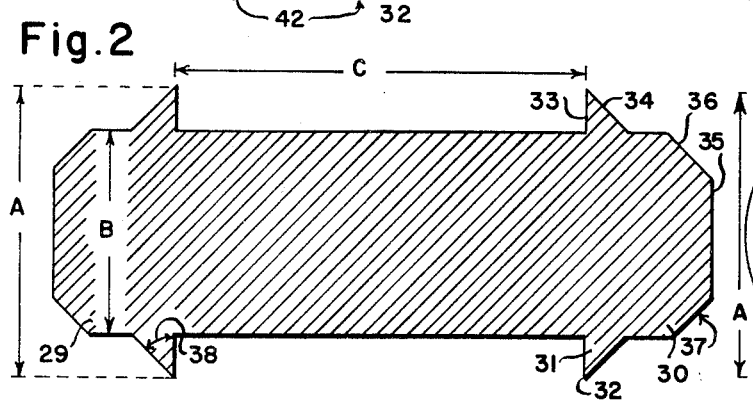
FIGURE 2 is an enlarged view of the coupling means of FIGURE 1, in half section.
Figure 3:
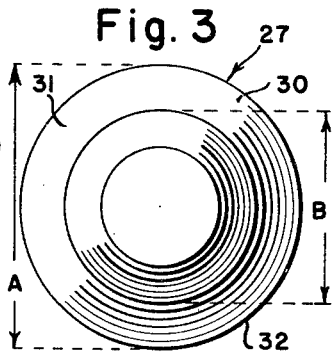
FIGURE 3 is an end view thereof.

In the embodiment of the invention illustrated in FIGURES 1–3, the outside diameter of tubing 20 is 0.07 inch and the outside diameter of tubing 20 is .17 inch. Shank 28 has a diameter B of 0.091 inch, i.e. 30% larger than the inside diameter of tubing 20. Gripping edge 32 has a diameter A of 0.127 inch, i.e. about 40% larger than the diameter of shank 28. The length C between the sharp external circular edges 32 of heads 29 and 30 is critical in that when coupling means 27 is of rigid material, such as metal, length C is relatively short, but when coupling means 27 is of flexible material, length C is relatively long.

Thus the structure and dimensions of the insert coupling 27 are such that the free ends 24 and 25 of the tube are maintained in a round configuration of substantially the same diameter in the area 42 at which the two free ends are joined, i.e. the space between gripping edges 32 on each of gripping heads 29 and 30.

The angle 38 formed by faces 33 and 34 may be deviated from to some extent, but when a single rib at each end is used, the bearing face 33, which is adapted for bearing the force exerted by tubing 20 on coupling means 27, should be substantially vertical.

Figure 4:
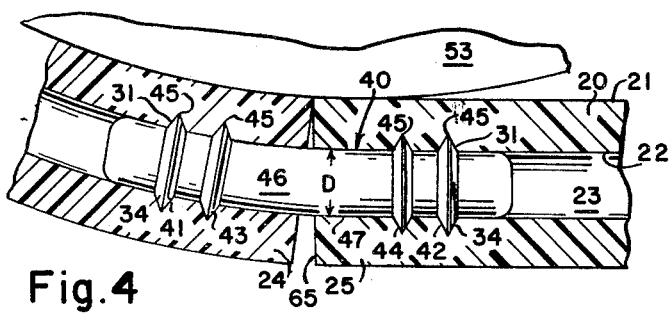
FIGURE 4 is a view similar to FIGURE 1 showing a flexible coupling means of the invention, in a belt, and passing around a pulley.

However, as shown in FIGURE 4, a one-piece, coupling means 40, when made of flxebile material such as polyurethane elastomer, may have truncated conical faces 41 and 42 in lieu of vertical bearing faces 33 on the ribs 31, provided there are a second pair of similar ribs, such as 43 and 44. Thus four sharp, continuous outer gripping edges 45 are provided to firmly anchor the flexible insert in the tube 20.

The shank 46 of flexible insert 40 is of a diameter D equal to the inside diameter of tube 20, and as in the case of coupling 27, the cylindrical surface 47 of the shank 46 is smooth and free of barbs, flanges, or other obstructions.

Figure 5:
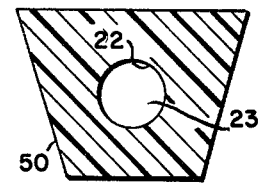
FIGURE 5 is an enlarged fragmentary side elevation, in half section, of a V belt having a hollow cavity for receiving a coupling.

As shown in FIGURE 5, an endless belt 50 of V cross section may be connected by the coupling means of the invention inserted in a suitable hollow space or cavity 23 therein, to take the place of the well known Size #40 Open End V belt which is connected by staples at the joint.

Figure 6:
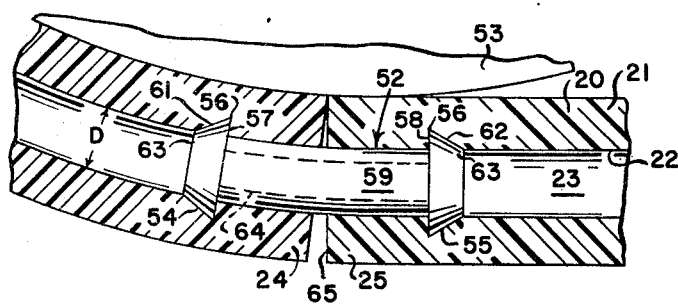
FIGURE 6 is a view similar to FIGURE 4 of another embodiment of the invention.

As shown in FIGURE 6, another embodiment 52 of the coupling means 27 is of flexible material, such as nylon, polyurethane or the like, and, as in the case of the flexible insert 40, is of relatively greater length C than the length C of the rigid coupling means 27 to permit flexing as the belt 20 passes around the sheave 53. Coupling means 52 has only a single pair of external ribs 54 and 55, each with an outer, sharp, continuous circular gripping edge 56, corresponding to edges 32, the bearing faces 57 and 58 being normal to the axis of the flexible, smooth shank 59, to correspond with the bearing faces 33. The truncated conical faces, 61 and 62, are preferably at an angle of about 30° to the shank axis and are continuous from the edge 56 to the terminal tip 63 of each head. As shown in dotted lines at 64, the coupling 52 may be hollow to increase the flexibility of the insert and it will be obvious that the coupling 40 may also be hollow for flexibility, if desired.

The relatively short shank 28 (length C) of the rigid insert means 27 is for the purpose of reducing the tendency illustrated in FIGURE 1, of the rigid insert to continue in its straight line path at the leading end, when rounding the curved path of the pulley 53, while the belt 20 seeks to flex into the curved path the shorter shank 28 shortens the ridged section of the belt joint and therefore reduces any whip, bump, or fracture effect. At velocities of 4000 r.p.m. and higher and/or with pulleys of 1⅜" diameter, or smaller, rigid metal couplings such as 27, tend to create fatigue directly in advance, or in rear, of the coupling insert, caused by the bi-axial stretch on the belt by the insert and the anability of the belt to flex and follow its natural path due to the rigid, ribbed insert.

Figure 7:
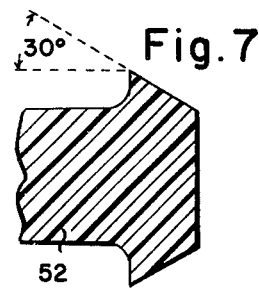
FIGURE 7 is an enlarged fragmentary side elevation, in half section, of the coupling insert shown in FIGURE 6.

By forming the insert of flexible, tough plastic, a reliable, long-lasting joint is provided at the higher speeds. As shown in FIGURE 4 and FIGURE 6, the ends, 24 and 25, of the belt are able to form a slight gap 65 in rounding the curved path, the gap 65 closing along the straight stretch of the belt. The 30° angle of the flexible circular insert 40 (FIGURE 7) has been found to permit easier insertion while giving more support to the sharp gripping edges 56 of the heads.

The resistance to flexing of the flexible inserts 40 and 52 is proportional to the thickness in cross section of the shank. The hollow 64 permits flexibility for small diameter sheaves while providing good stiffness and anchoring effect to the circular, continuous edges 56 and 45.

As shown in the table set out below, while the flexible inserts of the invention may have a shank diameter B equal to the inside diameter of the belt 20, a greater diameter of the shank is preferred.

| Belt size | Belt dimensions | | | Insert dimensions | | | Conditions | Max. r.p.m. | Min. pulley dia. (in.) |
|---|---|---|---|---|---|---|---|---|---|
| | ID | OD | Wall | Dia. A | Dia. B | Length C | | | |
| Special | .070 | .170 | .050 | .115 | .080 | .250–.200 | May be used with flexible insert or rigid insert. | 10 M / 4 M | 1 / 1½ |
| 3/16 | .080 | .187 | .055 | .135 | .090 | .250 | Rigid insert recommended. | 4 M | 1½ |
| 1/4 | .100 | .250 | .074 | .155 | .115 | .250 | (Minimum Pulley diameter preferably about eight times the belt diameter) | 4 M | 1½ |
| 5/16 | .127 | .312 | .092 | .190 | .140 | .312 | | 4 M | 1½ |
| 3/8 | .152 | .375 | .111 | .215 | .170 | .375 | | 4 M | 1½ |
| 7/16 | .177 | .437 | .129 | .245 | .195 | .437 | | 4 M | 1½ |
| 1/2 | .205 | .500 | .147 | .300 | .230 | .500 | | 4 M | 1½ |

The 30°, or more, slope of the heads of the insert, plus the enlarged diameter of the shank, while tending to make insertion into the tube more difficult, are responsible for the unusual tenacity with which the insert anchors the belt during use because of the increased friction, the internal pressure of the smaller diameter, stretched belt and the consequent pentration embedment, or distortion of the belt by the edges 32.

The belt and coupling of the invention are especially for use on a typical textile spinning frame of the type in which perhaps one hundred spindles on each side are each driven by an individual belt. It is usually impossible to replace a closed, one-piece loop belt in such a machine because of other parts and inability to adjust length. The belt 20 of this invention is easily cut to the correct length, trained on the pulleys and joined by an insert 27, 40, or 52 at the free ends by manually pressing the insert into position. Typically, the belt will operate under a tension of about ten pounds and at about three thousand r.p.m., but will withstand considerably greater tension without separating at the joint.

The continuous, circular edge configuration of the gripping heads of the insert coupling of the invention has been found to avoid cutting into the material of the tube under light load conditions of up to about three pounds. Under loads of three pounds, or more, the sharp, circular edges may distort and embed or partially cut and penetrate into the material. Any penetration is significant but does not result in excessive tearing of the belting because of the shape of the gripping heads and the toughness of the elastomeric polymer.

The particular belt illustrated is designed to run at the maximum of 4000 r.p.m., a running load of five pounds and twenty pounds starting torque at the point of connection. The sharp circular edges may indent and cut into the tube wall, under these conditions, but will not continue to cut or tear, as would a plow cutting a furrow, because of the flat bearing faces of the heads or because of the multiple ribs.

What is claimed is:

1. An endless belt assembly comprising a belt of tough elastic, tear-resistant polymeric material, internal cavities in each end of said belt, coupling means, each end of which is inserted into one of said cavities, thereby forming an endless belt, said coupling means comprising a central shaft with a gripping head proximate each end of said shaft, said gripping heads having continuous, circumferential, sharp gripping edges projecting outwardly from said shaft, said sharp edges forming anchoring means, and said central shaft having a diameter of at least about 20% greater than the diameter of said cavities.

2. An assembly as defined in claim 1, wherein said tough elastic polymeric material is characterized by a nicked tear strength of over about 200 pounds per inch and elastic extensibility of at least four percent with an applied tensile force of less than five pounds.

3. An assembly as defined in claim 2, wherein said tough elastic polymer is a thermoplastic polyurethane.

4. An assembly as defined in claim 1, wherein the diameter of said central shaft is approximately 30% greater than the inside diameter of said internal cavities.

5. An assembly as defined in claim 1, wherein said coupling means is formed of said tough, elastic, tear-resistant, polymeric material.

6. An assembly as defined in claim 1, wherein each said gripping head is an integral, annular outwardly projecting rib having a smooth continuous, truncated, conical, outer face relatively sharply inclined to the axis of said shaft at an angle of at least 30°.

References Cited

UNITED STATES PATENTS

| 132,205 | 10/1872 | Faught | 74—238 |
| 1,271,014 | 7/1918 | Bower | 74—238 |
| 1,378,507 | 5/1921 | Wiegand | 74—238 |
| 2,038,469 | 4/1936 | Bannister | 74—238 XR |
| 2,969,686 | 1/1961 | Runton. | |

FRED C. MATTERN, JR., Primary Examiner

J. A. WONG, Assistant Examiner

U.S. Cl. X.R.

24—31